United States Patent [19]

Forest

[11] Patent Number: 5,779,291
[45] Date of Patent: Jul. 14, 1998

[54] AQUARIUM TOOL

[76] Inventor: Robert Forest, 5505 N. Scarsdale Cir., Reno, Nev. 89502

[21] Appl. No.: 742,671

[22] Filed: Nov. 4, 1996

Related U.S. Application Data

[63] Continuation-in-part of Ser. No. 559,939, Nov. 17, 1995, Pat. No. 5,601,322.

[51] Int. Cl.⁶ ........................................................ B25J 1/02
[52] U.S. Cl. ........................ 294/3; 294/19.1; 15/105; 15/144.1
[58] Field of Search ................... 294/2, 3, 3.6, 15, 294/19.1, 24, 26, 57; 601/137, 138; D28/99; 81/177.8, 177.9; 7/167, 168; 15/105, 144.1, 144.2, 145, 236.01; 16/114 R; 623/64, 65

[56] References Cited

U.S. PATENT DOCUMENTS

| | | | |
|---|---|---|---|
| D. 208,894 | 10/1967 | Wedermeyer | D28/99 |
| D. 369,439 | 4/1996 | Fischer | D28/99 |
| 687,363 | 11/1901 | Wirt | 601/137 |
| 895,126 | 8/1908 | Thomson | 294/26 |
| 3,199,905 | 8/1965 | Johnson | 294/19.1 |
| 4,033,618 | 7/1977 | Lamb | 294/19.1 |
| 4,461,192 | 7/1984 | Suligoy et al. | 81/177.8 |
| 4,571,766 | 2/1986 | Goldman et al. | 15/105 |
| 5,566,418 | 10/1996 | Steffen et al. | 15/144.1 |
| 5,601,322 | 2/1997 | Forest | 294/118 |

*Primary Examiner*—Dean Kramer
*Attorney, Agent, or Firm*—Herman H. Bains

[57] ABSTRACT

An aquarium tool kit comprises a handle which may include a single handle section or a plurality of similar handle sections. Each section has quick coupling elements at opposite ends thereof for ready connection to adjacent handle sections. Each handle section includes a bendable portion intermediate the ends thereof to allow angular adjustment of the section. A plurality of implements are provided including a scoop simulating a hand, hook and a needle type scraper. Each implement has a quick coupling element for ready connection to a handle section.

5 Claims, 1 Drawing Sheet

U.S. Patent  Jul. 14, 1998  5,779,291
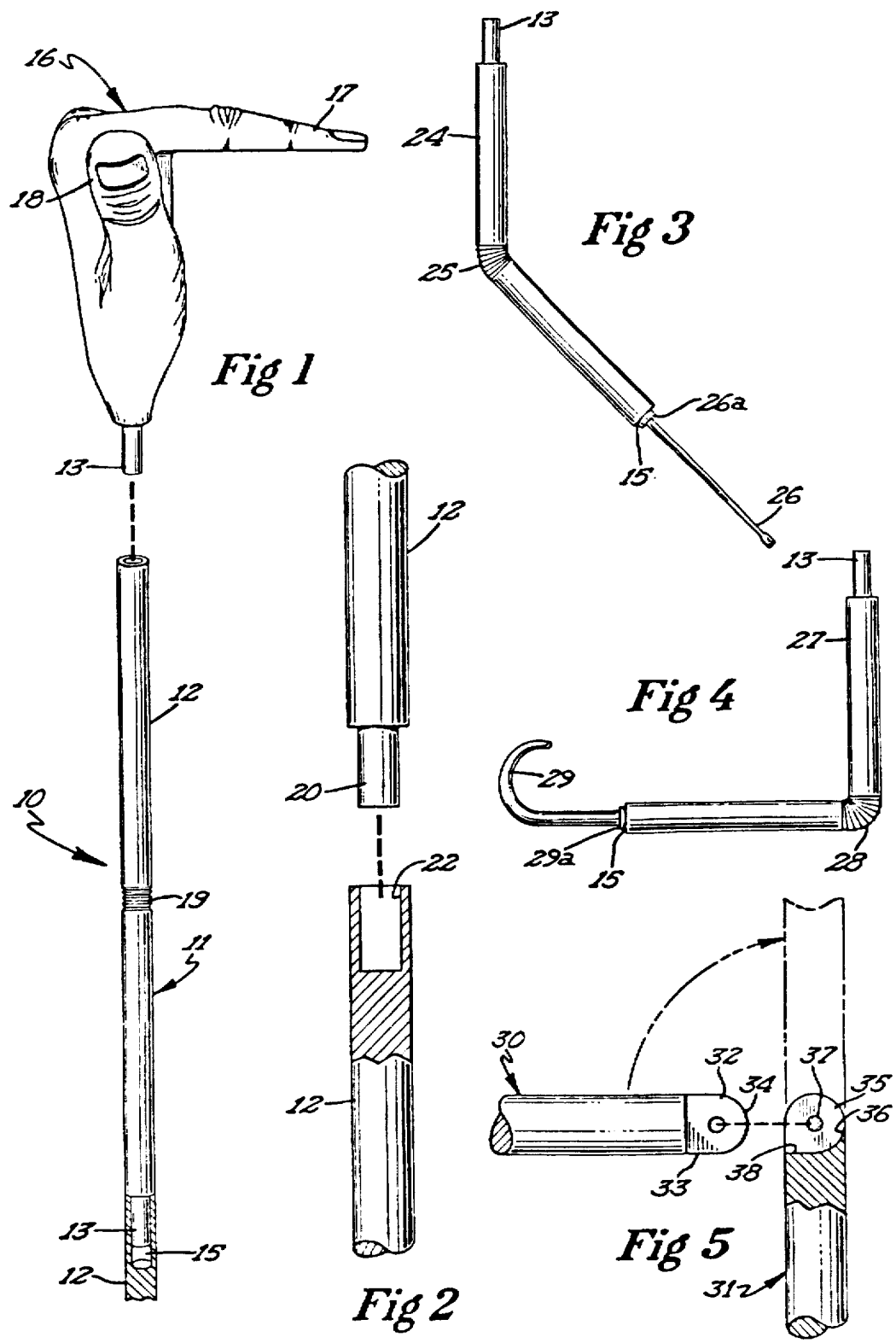

AQUARIUM TOOL

FIELD OF THE INVENTION

This invention relates to an aquarium tool kit and more particularly for an adjustable aquarium tool kit having a side range of functions. It is a continuation-in-part of my application Ser. No. 08/559,939, filed Nov. 17, 1995 now U.S. Pat. No. 5,601,322 and entitled "Aquarium Tool".

BACKGROUND OF THE INVENTION

Aquarium tools have been developed for performing certain functions including placement, removal or repositioning items or specimens in aquariums and for cleaning aquariums. For example, nets are commonly used to remove fish or other live specimens from aquariums, and other tools are used to clean, set up or maintain aquariums. Aquariums vary in size and configuration, and, if all of the necessary tools were available, different size tools or implements for different size aquariums would be required.

In an embodiment of the invention in my co-pending application, the aquarium tool kit has the configuration of tongs for use with several different implements. The invention of the instant application uses a more simple handle configuration.

SUMMARY OF THE INVENTION

It is an object of this invention to provide an aquarium tool kit which is readily adjustable for use with aquariums of different size and which has a plurality of readily interchangeable implements for performing different functions.

In the preferred embodiment of my invention, the aquarium tool kit includes an elongate handle which may comprise a single handle section or plurality of handle sections. Each handle section has a coupling element on each end permitting the sections to be releasably connected together. Each handle section also includes a bendable portion intermediate the ends thereof. The aquarium kit disclosed in my co-pending application includes various implements including scoops, sponges, nets, tines, blades, brushes and other implements.

BRIEF DESCRIPTION OF THE FIGURES OF THE DRAWING

FIG. 1 is an exploded perspective view illustrating the sectional handle of the aquarium tool with certain parts broken away and a scoop type implement simulating a hand;

FIG. 2 is an exploded view illustrating a quick snap coupling for quickly interconnecting a pair of a pair of handle sections;

FIG. 3 is a perspective view of a scraper tool implement and;

FIG. 4 is an elevational view of a hook implement.

FIG. 5 is an elevational view of a different embodiment of a pair of interconnected handle sections with certain parts thereof broken away for clarity.

DESCRIPTION OF THE PREFERRED EMBODIMENT

Referring now to the drawings, and more particularly to FIG. 1, it will be seen that one embodiment of my novel aquarium tool, designated generally by the reference numeral 10, is thereshown. The aquarium tool 10 includes an elongate sectional handle 11 which may be comprised of a plurality of handle sections 12. Each handle section 12 is formed of a suitable rigid plastic material and in the preferred embodiment each section has a male coupling element 13 at one end thereof and a female coupling element 15 at the other end thereof.

The male coupling element 13 is simply a reduced cylindrical portion and the female coupling element is the cylindrical end or sleeve 15 of the handle for receiving and locking to the male coupling element.

It is pointed out that a single handle section may be used as the handle or several such handle sections may be coupled together to form the handle. The length of the handle is determined by the size of the aquarium in which the tool is being used. The handle sections may include handle sections of the same length and handle sections of varying lengths.

In the embodiment of FIG. 1, a scoop type implement or tool 16 is shown. This implement simulates a hand. The hand scoop 16 is provided with fingers 17 and a thumb 18. The fingers 17 collectively extend approximately at right angular relation to the hand thereby defining the scoop-like configuration. This implement is provided with a cylindrical male coupling element 13 which functionally fits within the female coupling element 15 on the handle section 12.

It is pointed out that the handle section 12 is provided with a bendable portion 19 intermediate the ends thereof. In the preferred embodiment at least one handle section 12 of a handle will have a bendable portion 19 to permit the handle section to be angularly bent to a desired angular position and thereafter returned to its original straight configuration. It is also pointed out that certain handle sections may not include a bendable portion, as for example certain short sections. However, the bendable feature of the handle sections is important in angularly adjusting the handle for access to small or difficult located areas.

Referring now to FIG. 2, a pair of similar handle sections are thereshown. One end of a handle section 12 is provided with a reduced cylindrical coupling element 20. One end of an adjacent handle section 12 has a cylindrical socket 22 permits ready connection and disconnection of handle sections and/or implements.

Referring now to FIG. 3, it will be seen that a different embodiment of a tool is thereshown. The embodiment of FIG. 3 includes a handle section 24 having a reduced cylindrical male coupling element 13 projecting from end thereof and a female socket element 15 at the other end thereof. The male coupling element 13 is identical to the male coupling element 13 illustrated in FIG. 1 and functually engages in the annular recess in the female coupling element of an adjacent handle section.

The handle section 24 has a bendable portion 25 located intermediate the ends thereof to permit angular adjustment of the handle section 24. An elongate needle type scraper 26 is connected to the handle section and projects therefrom. The needle type scraper 26 is used to scrape and clean small surfaces. In the embodiment shown, the needle type scraper is functionally coupled to the handle section 24 in the manner of FIG. 1 by a cylindrical male coupling element 26a. However, any tool may be integrally formed with the associated handle section.

Referring now to FIG. 4, it will be seen that a different aquarium implement or tool is thereshown. The implement is illustrated with a handle section 27 having cylindrical male coupling element 13 projecting from one end thereof and a female coupling element is at the other end thereof. The male coupling element 13 functionally engages in the female coupling element or an adjacent handle section. The handle section 27 is provided with a bendable portion 28 intermediate the ends thereof.

The implement connected with the handle section comprises a hook 29 which is used to extricate objects, such as dead fish, from confined areas. The hook type implement 29 is functionally coupled to the female coupling element 15 by a male coupling element 29a in the manner of FIG. 1.

In use, an aquarium tool comprising a handle including a single handle section or a plurality of handle sections is coupled to a selected implement for performing a specific aquarium job. For example, in smaller aquariums, a single handle section may suffice, but in larger aquariums, such as octagon tanks, a much larger handle is required.

A single simulated hand 16 may be used to move, remove or replace conventional sized objects in an aquarium. However, a pair of handles each having a simulated hand 16 secured thereto allows a user to manipulate large objects, such as rocks and similar objects, which normally require a user to use both hands when performing such a function.

Referring now to FIG. 5, it will be seen that a different embodiment of the connection between a pair of handle sections is thereshown. The handle sections 30 and 31 are pivotally connected together for pivotal movement through an arc of approximately ninety (90°) degrees. The handle section 30 has an end portion 32 which is laterally reduced or recessed having straight parallel edge portion 33 and an arcuate end 34.

Handle section 31 has one end thereof recessed to define a pair of ears 35 between which the laterally reduced end portion 32 is positioned. A screw 37 threadedly engages threaded openings in the reduced end portion 32 and the ears 35. It will be noted that the surface located between the ears 35 includes an arcuate portion 36 and a straight portion 38. It will be seen that a straight portion 33 on the reduced end portion 32 will engage the straight edge portion 38 when the handle sections are disposed in ninety degree angular relation. By loosening the screw 37, the handle sections may be variously adjusted through a number of angular positions. Thus the handle sections are adjustable between a longitudinally aligned position, and various angular positions through an arc of ninety degrees. Pivotally connected handle sections 30 and 31 are especially useful with the simulated hand 16.

The needle type scraper allows scraping of small surfaces and the hook permits movement or removal of objects from confined, generally inaccessible areas. The bendable portion of the handle sections permits a wide range of adjustments of the handle. Such adjustments are necessary for effective use of the tool or tools. It will be appreciated that the handle including the handle sections and tool are shaped and dimensioned for use in an aquarium.

One of the advantages of the aquarium tool and tool kit is the avoidance of water contamination by a user. When a person manually manipulates objects in an aquarium, such a person introduces bacteria and other contaminants into the aquarium. The use of my novel tool obviates the need to immerse ones hands into the aquarium water.

Thus it will be seen that I have provided a novel aquarium tool kit which is effective in moving, removing and replacing objects in an aquarium while minimizing contamination thereto.

What is claimed is:

1. An aquarium tool kit for use in structuring, maintaining and restructuring aquariums of any size and shape, comprising an elongate sectional handle including a plurality of elongate handle members, each handle member having quick coupling elements at each end thereof for quick coupling and uncoupling to the coupling element on an adjacent handle member, at least one of said handle members having a bendable portion intermediate the ends thereof said one handle member being bendable from elongate straight configuration to angular configuration to permit angular adjustment of said handle from straight position, an aquarium implement for performing a specific function, and having a quick coupling element secured thereto for quick coupling to a handle member, said implement being selected from the group comprising an L-shaped scoop simulating a hand, a hook and a needle type scraper, said handle members and said implement being shaped and dimensioned for use in an aquarium.

2. The aquarium tool kit as defined in claim 1 wherein said implement comprises a L-shaped scoop simulating a hand.

3. The aquarium tool kit as defined in claim 1 wherein said implement comprises a needle shaped scraper.

4. The aquarium tool kit as defined in claim 1 wherein said implement includes a hook.

5. The aquarium tool kit as defined in claim 1 wherein each of said handle members includes bendable portions intermediate the ends thereof for angularly adjusting the handle.

* * * * *